United States Patent
Park

(10) Patent No.: US 8,134,844 B2
(45) Date of Patent: Mar. 13, 2012

(54) PORTABLE TERMINAL OF SLIDE-DOWN OPENING AND CLOSING TYPE

(76) Inventor: Kwang Duck Park, Bucheon-si (KR)

( * ) Notice: Subject to any disclaimer, the term of this patent is extended or adjusted under 35 U.S.C. 154(b) by 428 days.

(21) Appl. No.: 12/492,011

(22) Filed: Jun. 25, 2009

(65) Prior Publication Data

US 2009/0260465 A1 Oct. 22, 2009

Related U.S. Application Data

(63) Continuation-in-part of application No. PCT/KR2007/005830, filed on Nov. 20, 2007.

(30) Foreign Application Priority Data

Dec. 29, 2006 (KR) .................. 10-2006-0138371

(51) Int. Cl.
*H04B 1/03* (2006.01)
*H05K 5/02* (2006.01)

(52) U.S. Cl. .................. 361/814; 361/756; 361/797

(58) Field of Classification Search .................. 361/680, 361/756, 797, 814; 455/575.1–575.4, 89, 455/90, 550, 332
See application file for complete search history.

(56) References Cited

U.S. PATENT DOCUMENTS

| | | | |
|---|---|---|---|
| 5,635,928 A | 6/1997 | Takagi et al. | |
| 5,971,637 A | 10/1999 | Malhi et al. | |
| 6,094,191 A | 7/2000 | Watanabe et al. | |
| 6,314,274 B1 | 11/2001 | Kumagai | |
| 6,791,826 B2 | 9/2004 | Ho | |
| 6,963,756 B2 * | 11/2005 | Lubowicki et al. | 455/550.1 |
| 6,972,944 B2 | 12/2005 | Clapper | |
| 7,221,561 B2 | 5/2007 | Pan et al. | |
| 7,437,186 B2 | 10/2008 | Park | |
| 7,492,606 B2 * | 2/2009 | Kim et al. | 361/797 |
| 7,580,726 B2 * | 8/2009 | Maatta et al. | 455/550.1 |
| 7,746,625 B2 * | 6/2010 | Lee et al. | 361/679.02 |
| 2005/0190291 A1 | 9/2005 | Kota et al. | |
| 2006/0120029 A1* | 6/2006 | Ryu et al. | 361/680 |
| 2006/0128449 A1 | 6/2006 | Park | |
| 2009/0035056 A1 | 2/2009 | Kim et al. | |

(Continued)

FOREIGN PATENT DOCUMENTS

JP 2000-106594 4/2000

(Continued)

OTHER PUBLICATIONS

Office Action from the Korean Intellectual Property Office dated Aug. 25, 2010, for Korean Application No. 10-2010-0057273 (3 pages).

*Primary Examiner* — Hung S Bui
(74) *Attorney, Agent, or Firm* — Harness, Dickey & Pierce, P.L.C.

(57) ABSTRACT

A portable terminal generally includes a first or main body and a second or sub-body. The sub-body is slidable relative to the main body between a closed position and an opened position. The sub-body is configured to drop downwardly into a stepped-down portion of the main body when the sub-body is in the opened position. At least one biasing device or elastic means may be provided for applying a force for biasing the sub-body to drop downwardly towards the stepped-down portion.

20 Claims, 6 Drawing Sheets

U.S. PATENT DOCUMENTS

2009/0215507 A1 * 8/2009 Park .......................... 455/575.4

FOREIGN PATENT DOCUMENTS

| | | |
|---|---|---|
| KR | 10-2002-0052542 | 7/2002 |
| KR | 10-0391379 | 7/2003 |
| KR | 20-0382501 | 4/2005 |
| KR | 10-2005-0041274 | 5/2005 |
| KR | 10-2005-0066598 | 6/2005 |
| KR | 10-2006-0081875 | 7/2006 |
| KR | 10-0751260 | 8/2007 |
| KR | 10-2008-0037193 | 4/2008 |
| KR | 10-2010-0080501 | 8/2010 |
| WO | WO 2008/004786 | 1/2008 |
| WO | WO 2008/082080 | 7/2008 |

* cited by examiner

[Fig. 1]
PRIOR ART
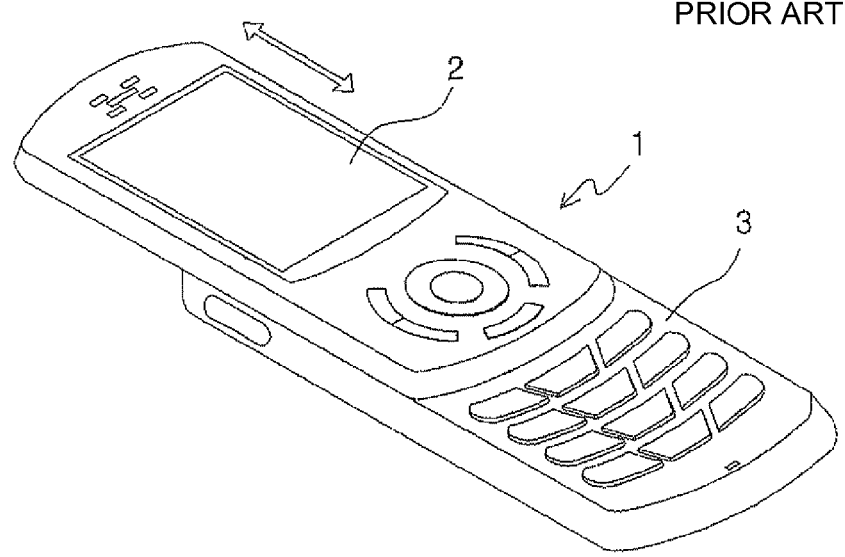
[Fig. 2]
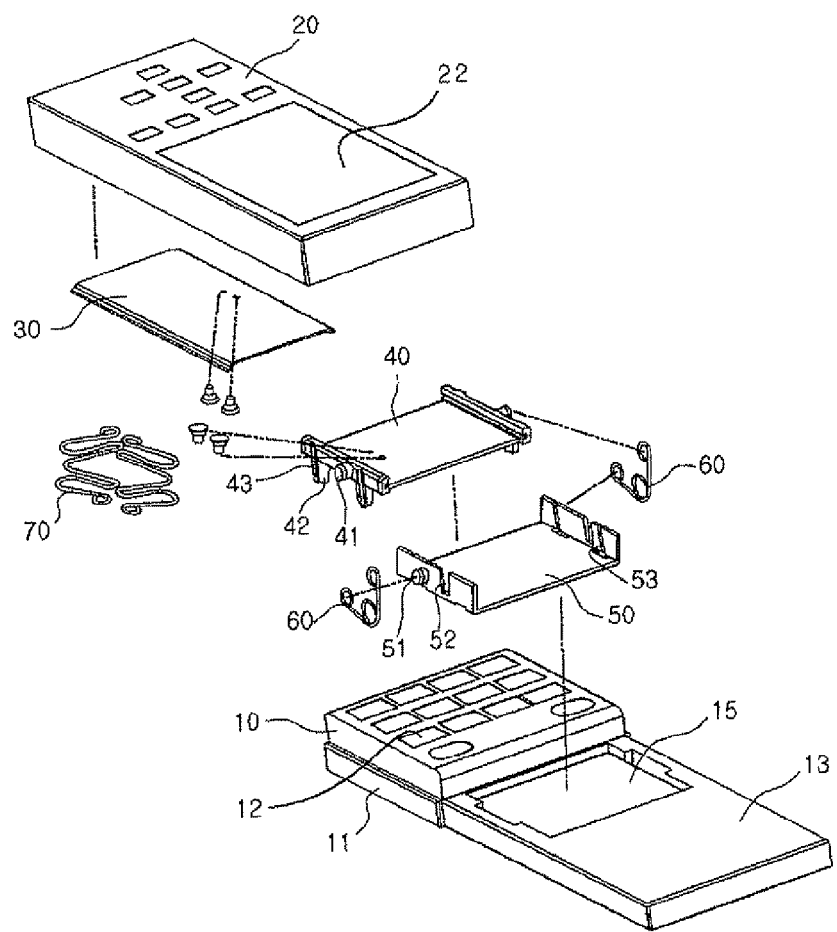

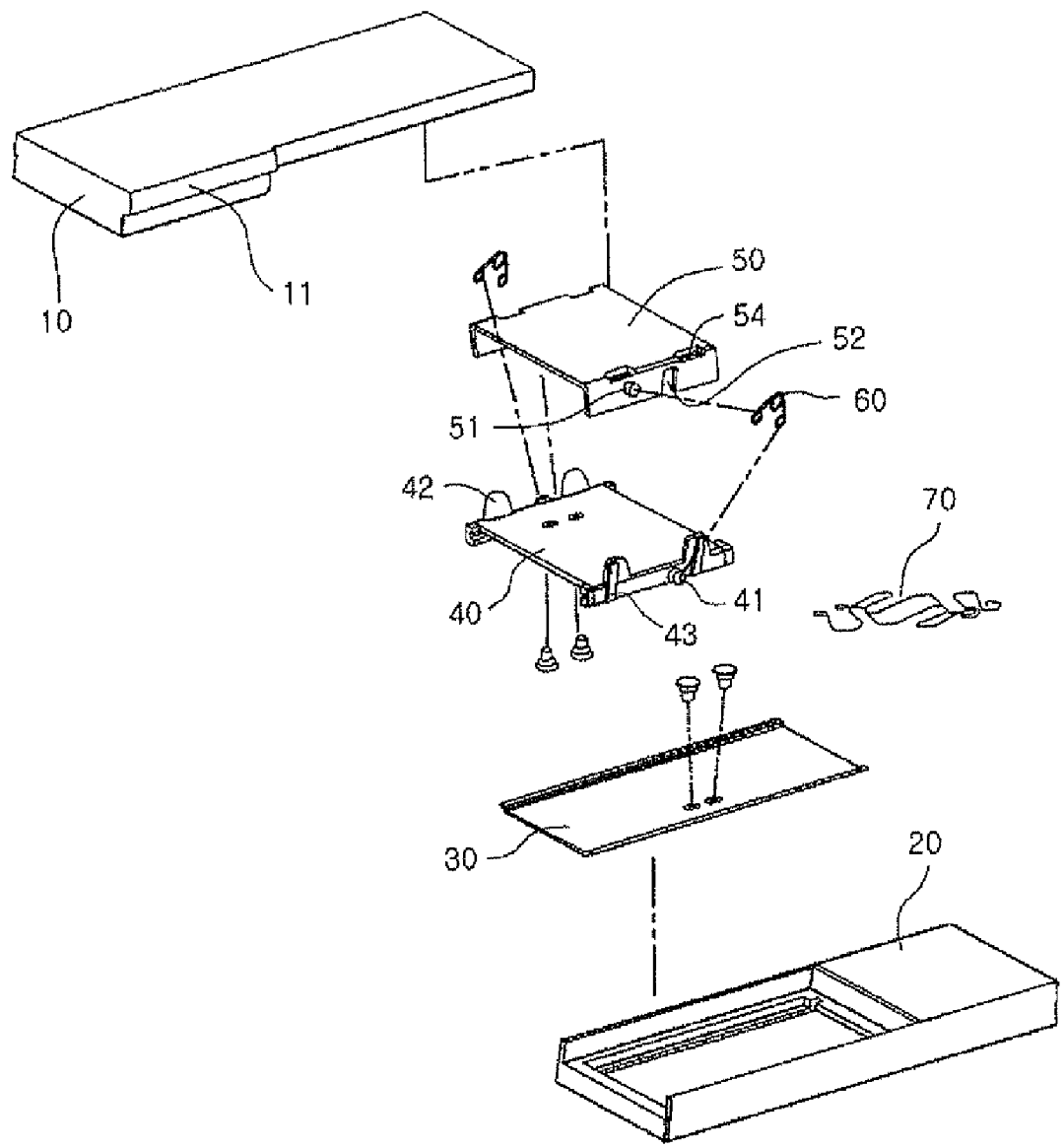
[Fig. 3]

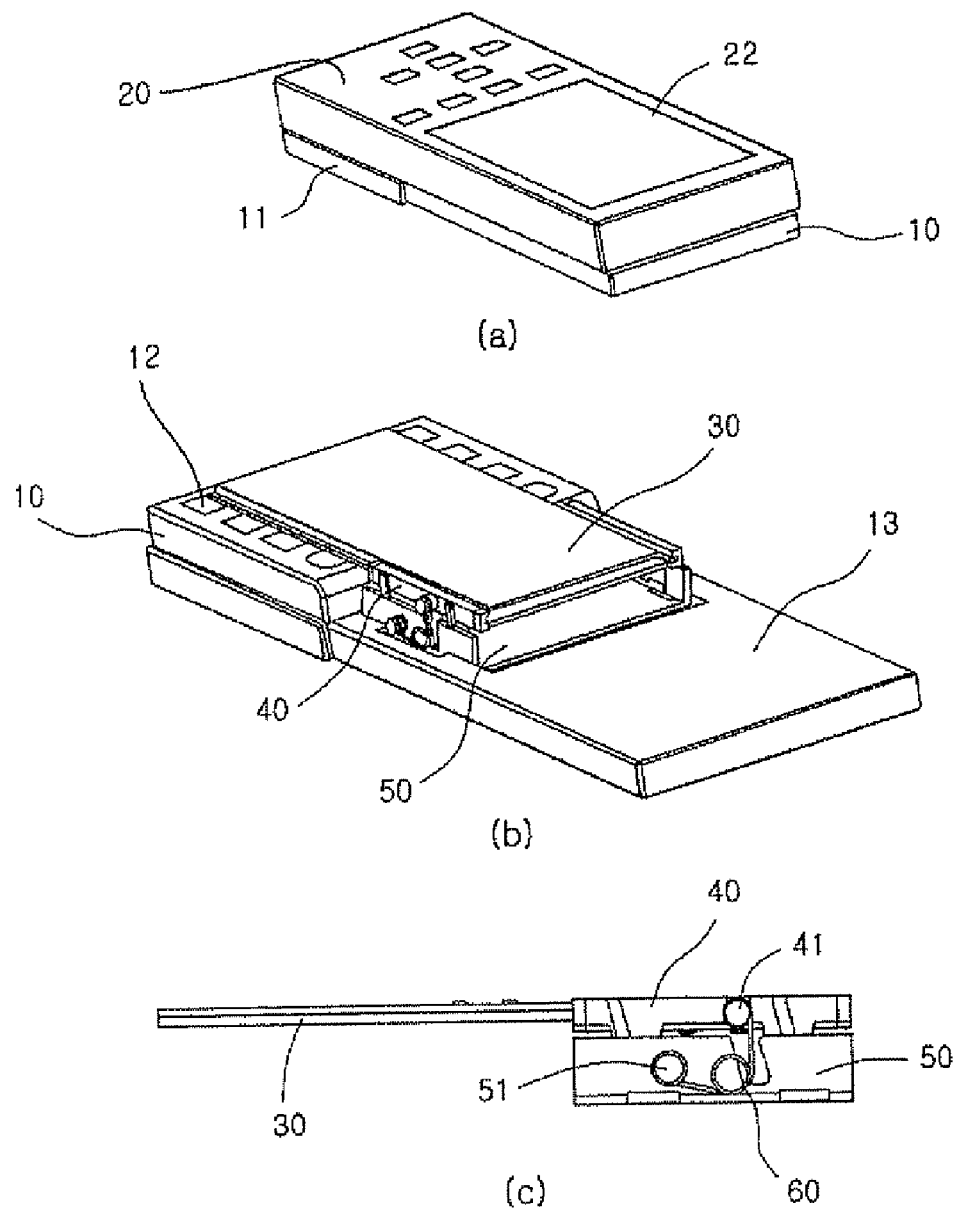

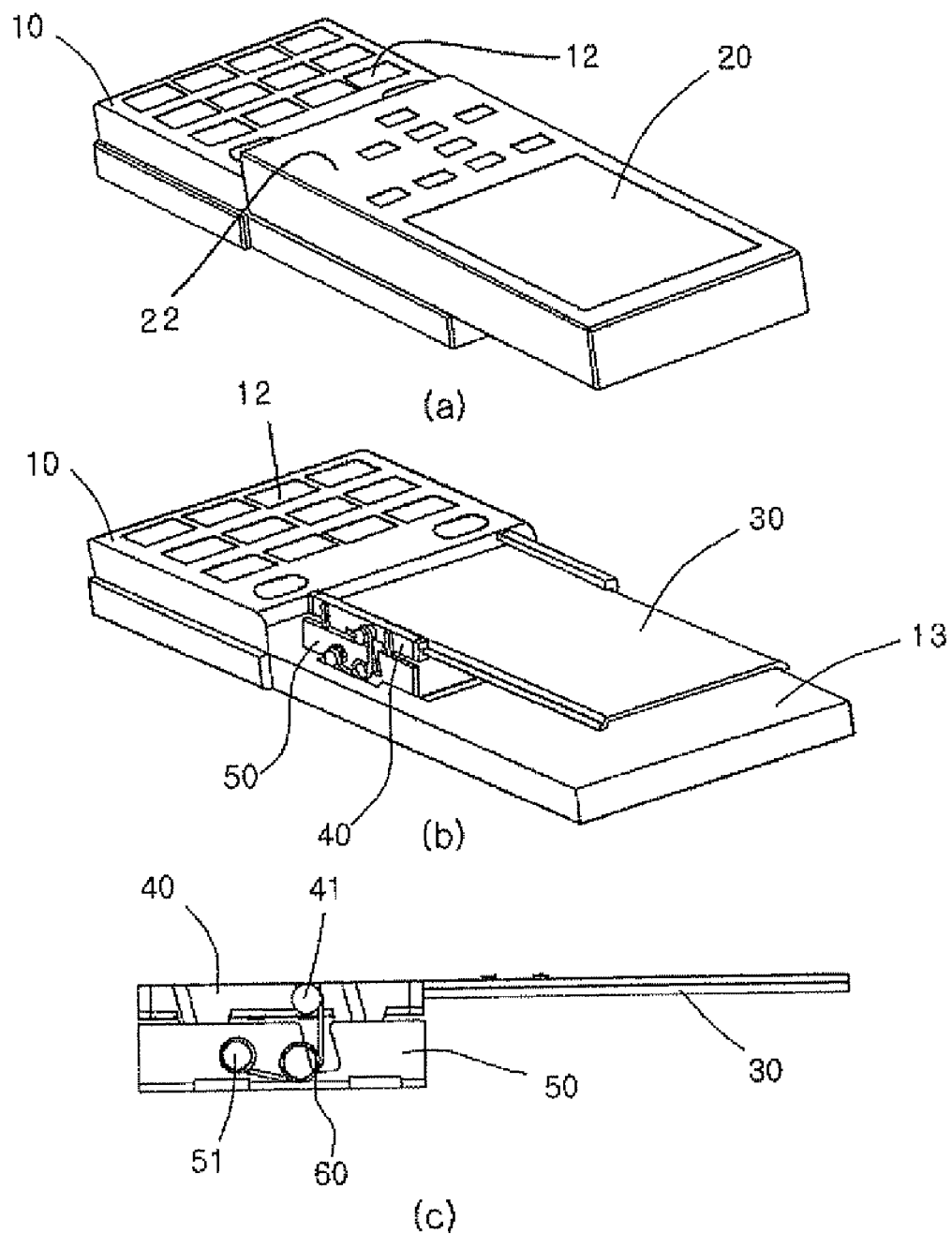

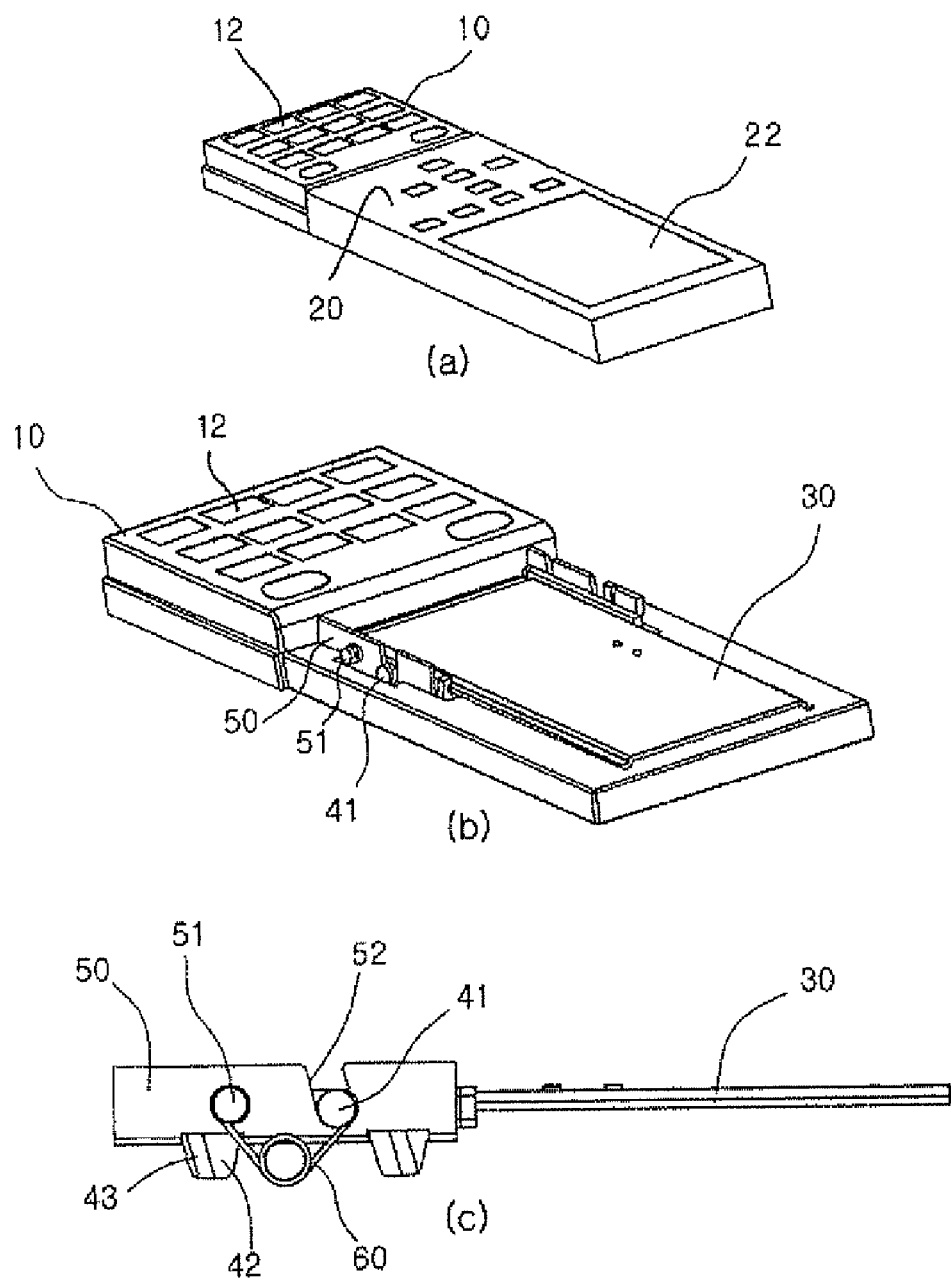

[Fig. 7]
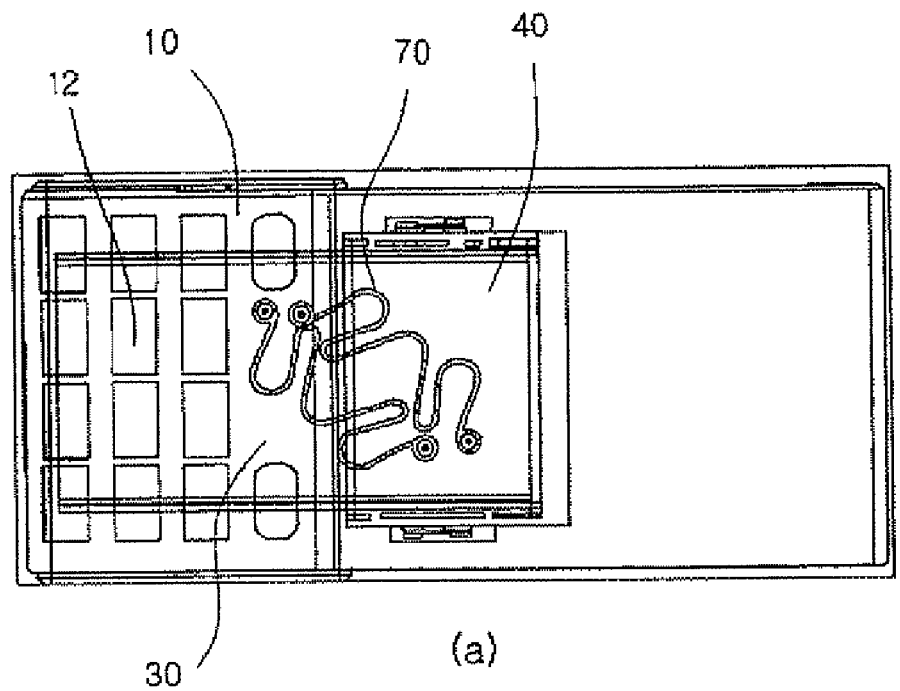
(a)
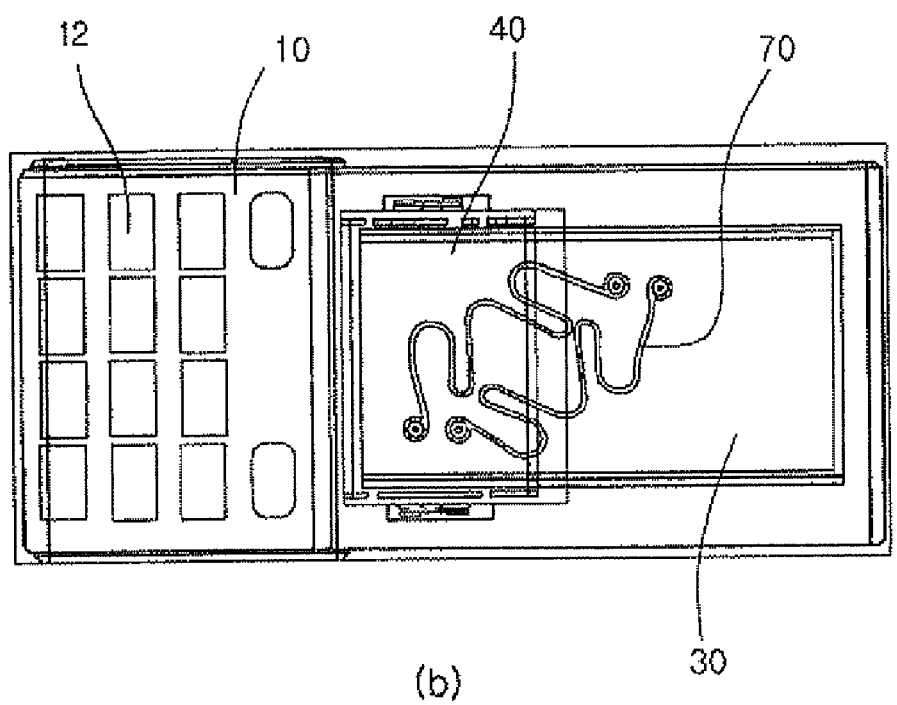
(b)

US 8,134,844 B2

PORTABLE TERMINAL OF SLIDE-DOWN OPENING AND CLOSING TYPE

CROSS-REFERENCE TO RELATED APPLICATIONS

This application is a continuation-in-part of PCT International Application No. PCT/KR2007/005830 filed Nov. 20, 2007 (published as PCT Publication No. WO 2008/082080), which claims the benefit and priority of Korean Application No. 10-2006-0138371 filed Dec. 29, 2006 (registered as KR10-799623 on Jan. 31, 2008). The entire disclosures of each of the above applications are incorporated herein by reference in their entirety.

FIELD

The present disclosure generally relates to a portable terminal of a slide-down opening and closing type, and more particularly, a portable terminal of a slide-down opening and closing type, in which the thickness of the terminal in a state of a sub-body being integrated into a main body can be reduced or minimized when the sub-body is opened from the main body, thereby improving the user's wearing comfort and the structural stability of the portable terminal.

BACKGROUND

This section provides background information related to the present disclosure which is not necessarily prior art.

Appearance of the prior portable terminals has been developed into a bar-type, a flip type, a folder type, and the like.

Recently, along with wide variations in the cellular phone design, a sliding-type portable terminal has been developed, where a sub-body equipped with a display slidably operates on a main body having a keypad. In the sliding-type portable terminal, the sub-body in a state of being closed can protect the key pad and avoid a malfunction thereof, and further a receiver is provided on the sub-body and a transmitter is provided on the main body and thus a distance between the receiver and the transmitter can be secured when the sub-body is opened.

In addition, in a sliding type terminal, a display provided on a sub-body is always directed forward and thus only one display can be used to reduce a manufacturing cost. Furthermore, it is advantageous for a user to see the display in a state of the sub-body being closed.

FIG. 1 shows an example of conventional sliding-type portable terminals. In the sliding-type terminal 1, a sub-body 2 is configured to slidably open and close with respect to a main body 3 as indicated by the arrow. But the conventional sliding-type terminal 1 maintains the combined thickness of the main body 3 and sub-body 2 all the time during operations, and thus when the sub-body is opened, the conventional sliding-type terminal 1 disadvantageously degrades the user's wearing comfort.

SUMMARY

This section provides a general summary of the disclosure, and is not a comprehensive disclosure of its full scope or all of its features.

Example embodiments of the present disclosure generally relate to portable terminals movable between at least closed positions and open positions. In addition, example embodiments of slider mechanisms and assemblies operable with the portable terminals are provided.

In one example embodiment, a portable terminal generally includes a first or main body and a second or sub-body. The sub-body is slidable relative to the main body between a closed position and an opened position. The sub-body is configured to drop downwardly into a stepped-down portion of the main body when the sub-body is in the opened position. At least one biasing device or elastic means may be provided for applying a force for biasing the sub-body to drop downwardly towards the stepped-down portion.

Another example embodiment includes a slider mechanism or assembly for a portable terminal having a first body and a second body. The second body is slidable relative to the first body between a closed position and an opened position. The first body includes a stepped-down portion. The second body is configured to be dropped downwardly into the stepped-down portion when the sub-body is slidably moved to the opened position. In this example, the slider mechanism generally includes a horizontal sliding plate configured to be coupled to the second body of the portable terminal. An up-down sliding plate is configured to be slidably coupled to the horizontal sliding plate. The up-down sliding plate is also configured to be coupled to the first body of the portable terminal. A support plate is configured to be installed in the stepped-down portion of the main body. At least one biasing device may be provided for applying a force for biasing the up-down sliding plate downwardly towards the stepped-down portion.

In a further example embodiment, a portable terminal generally includes a first body having a stepped-down portion and a second body. The second body is slidable relative to the first body between a closed position and an opened position. The second body is configured to drop downwardly into the stepped-down portion of the first when the second body is in the opened position. An up-down sliding plate is coupled to the first body. The up-down sliding plate includes fastening protrusions on generally opposite sides of the up-down sliding plate. A horizontal sliding plate is coupled to the second body. The horizontal sliding plate is slidably coupled to the up-down sliding plate. A support plate is installed in the stepped-down portion of the first body. The support plate includes second fastening protrusions and sliding grooves on generally opposite sides of the support plate. The sliding grooves have opened upper portions for slidably receiving the corresponding first fastening protrusions. At least two torsion springs may be provided, which are coupled to the corresponding pairs of the first and second fastening protrusions on the generally opposite sides of the up-down sliding plate and support plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view showing a conventional sliding-type portable terminal;

FIG. 2 is an exploded perspective view showing a portable terminal according to an embodiment of the invention;

FIG. 3 is an exploded perspective view of the portable terminal of FIG. 2;

FIGS. 4(a), 4(b), and 4(c) are respective perspective, partially exploded perspective, and sectional views of an assembled portable terminal shown in FIG. 2;

FIGS. 5(a), 5(b), and 5(c) are respective perspective, partially exploded perspective, and sectional views of the portable terminal shown in FIG. 4 and showing various states while opening and closing the portable terminal;

FIGS. 6(a), 6(b), and 6(c) are respective perspective, partially exploded perspective, and sectional views of the portable terminal shown in FIG. 4 in the opened stated; and FIGS. 7(a) and 7(b) are upper plan views showing the portable terminal shown in FIG. 4 in respective closed and opened states.

Corresponding reference numerals indicate corresponding parts throughout the several views of the drawings.

DETAILED DESCRIPTION

Example embodiments will now be described more fully with reference to the accompanying drawings.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As disclosed herein, various exemplary embodiments include slide-down opening and closing type portable terminals in which the overall thickness of the terminal can be reduced (or minimized in some embodiments) when a second or sub-body is slidably opened relative to a first or main body. By reducing the overall thickness of the opened portable terminal, the user's wearing comfort and the structural stability of the terminal may be improved.

According to one aspect of the present disclosure, a slide-down type portable terminal generally includes a first or main body having an upper surface that includes or is formed with a stepped-down part or portion. A second body or sub-body is slidably coupled to the main body. The sub-body is configured to be lowered or dropped into the stepped-down portion when the portable terminal is being opened. An elastic means or device (e.g., a spring such as a torsion spring, other biasing, elastic, or resilient members or devices, etc.) may be provided for applying an elastic or biasing force that biases the sub-body into the stepped-down portion during the sliding movement from the closed to open position.

In various embodiments, the portable terminal may further include a sliding mechanism or assembly installed between the sub-body and the main body for allowing the sub-body to be slid relative to or along the main body. In some embodiments, the sliding assembly comprises an up-down sliding plate and a support plate. The sliding plate may guide the sub-body to be slid horizontally and is slid itself in an up-down direction. The support plate may be installed in the stepped-down portion so as to guide the up-down sliding plate to slide in the up-down direction. The sliding assembly may further include a horizontal sliding plate that is arranged on the rear surface of the sub-body and is guided by the up-down sliding plate to be slid horizontally. The sliding assembly may also include a horizontal movement spring arranged between the horizontal sliding plate and the up-down sliding plate such that the spring is relaxed in a state of the sub-body being opened or closed.

Additionally, the up-down sliding plate may include or be formed with a first fastening protrusion on a side of the up-down sliding plate. The support plate may include or be formed (e.g., integrally formed on the side of the support plate, etc.) with a second protrusion part and a sliding groove having an upper portion which is opened. The elastic means may be configured or arranged on the first and second fastening protrusions. The first fastening protrusion may be slid along the up-down sliding groove.

The upper part of the up-down sliding groove may be configured or arranged on the lower part of the first fastening protrusion, and the up-down sliding groove may be configured to extend or be formed obliquely. Furthermore, a downward stopper may protrude form or be formed protrudingly on the side of the up-down sliding plate. An insertion hole into which the downward stopper is inserted may be included, provided, or formed on the support plate. In various embodiments, the downward stopper may be tapered downward.

A guide protrusion may be included, provided, or formed on the side of the downward stopper. A guide groove into which the guide protrusion is inserted and slid may be included, provided, or formed on the side of the support plate.

A support protrusion for supporting the sub-body may be provided or formed up to the place where the stepped-down portion is provided or formed on the side of the main body so as to help avoid the sub-body from being dropped in a state of the sub-body being closed.

Accordingly, there are disclosed various embodiments in which a slide down opening and closing type portable terminal may be opened by sliding the sub-body relative to or along the main body, and in which the combined thickness of the terminal may be reduced. The reduction in thickness may then improve user's wearing comfort and the structural stability of the terminal.

With reference now to figures, FIGS. 2 through 7 illustrate an example embodiment of a portable terminal including a sliding assembly or mechanism embodying one or more aspects of the present disclosure. As disclosed herein, embodiments of the present disclosure should not be limited to any particular type of the portable terminal or device. Instead, embodiments of the present disclosure may be used with a wide range of portable terminals including, for example, portable communications terminals or devices such as cellular phones, personal digital assistants (PDAs), other electronic devices, within the scope of the present disclosure.

As shown in FIG. 2, the portable terminal generally includes a first or main body 10 and a second body or sub-body 20. The bodies 10 and 20 are slidably coupled to each other. By way of example, the main body 10 may be equipped with a keypad 12 for performing various functions associated with the portable terminal. The sub-body may be equipped with a screen 22 for displaying different operations of the portable terminal. The main body and sub-body may be electrically connected for operation, for example, through a flexible PCB.

The sub-body may be coupled to the main body such that the sub-body can move (e.g., slide, etc.) relative to the main body generally upwardly and downwardly for opening and closing the portable terminal. A system (e.g., a male and female track system, etc.) may be provided for coupling the sub-body to the main body and for achieving smooth movement between the sub-body and the main body. In the illustrated embodiment, the main body 10 and sub-body 20 are fixedly coupled to plates or members 30, 40, respectively, via fasteners (e.g., rivets, etc.). In turn, the plates 30 and 40 are slidably engaged by the side edges of the plate 30 (also referred to herein as the "horizontal sliding" plate 30) being slidably engaged in the grooves of the plate 40 (also referred to herein as the "up-down sliding" plate 40). Alternative systems may also be used to slidably couple the sub-body to the main body within the scope of the present disclosure. In addition, other exemplary embodiments may include the plates 30, 40 being formed as integral parts of main body and sub-body, etc.

To expose the keypad for use, the portable terminal can be moved to an open position by sliding the sub-body upwardly or downwardly relative to the main body. The terms "main body" and "sub-body" used herein generally refer to and mean a stationary portion and a sliding portion of a portable terminal, respectively, when a user operates to open and close the terminal. But the user may also choose to move the main body relative to the sub-body while holding the sub-body stationary to accomplish the opening and closing of the terminal. Or the user may move both the main body and the sub-body relative to each other to open and close the terminal. Accordingly, the particular manner and variations by which a user chooses to open and close the terminal should not be viewed as limitations to the scope of the present disclosure.

FIG. 2 also illustrates various other components of the portable terminal including a stepped-down portion or part 13 and a support plate 50. As shown, the plate 40 is configured to be engaged within or provided on the stepped-down portion 13 so as to guide the sub-body 20 and the horizontal sliding plate 30 to be slid horizontally. In use, the up-down sliding plate 40 is slid in an up-down direction by the support plate 50.

The support plate 50, together with the sliding plate 40, is provided on the stepped-down part 13 to guide the up-down sliding plate 40 to be slid. That is, the horizontal sliding plate 30 and the up-down sliding plate 40 are configured for the sub-body 20 to be moved horizontally, and the up-down sliding plate 40 and the support plate 50 are configured for the sub-body 20 to be moved up-down.

A fixing groove or recess 15 is included, provided, or formed on the stepped-down part 13 of the sub-body 20 such that the support plate 50 is inserted and seated therein.

Two torsion springs 60 (broadly, a biasing member, resilient member, elastic, member, etc.) are connected to the respective sides of the up-down sliding plate 40 and the support plate 50 to allow the up-down sliding plate 40 to slide semi-automatically on the support plate 50 in an up-down direction. Alternately, other biasing, resilient, or elastic members may be used for biasing the up-down sliding plate 40 in a direction towards the groove 15 of the stepped-down part 13. Moreover, any number of suitable biasing members, resilient members, or elastic members may be provided.

As shown in FIGS. 2 and 4(b), a first fastening protrusion 41 is included, provided, or formed on the respective sides of the up-down sliding plate 40. A second fastening protrusion 51 is included, provided, or formed on the respective sides of the support plate 50. The support plate 50 also includes "up-down" sliding grooves 52 along the sides thereof adjacent the second fastening protrusions 51. The upper portions or parts of the grooves 52 are opened, such that the protrusions 51 may be slid into the grooves 52.

Each torsion spring 60 is installed in a generally relaxed state to the first and second fastening protrusions 41, 51, as shown in FIGS. 4(b) and 4(c). As shown by a comparison of FIGS. 5(c) and 6(c), the first fastening protrusion 41 may be slid in a generally up and down direction (or from left to right in FIGS. 5(c) and 6(c)) along with the up-down sliding groove 52.

In this exemplary embodiment, torsion springs are used as the elastic means for biasing the up-down sliding plate 40 in a direction towards the groove 15 of the stepped-down part 13. But other elastic, resilient, or biasing means may be used for producing an elastic or biasing force for moving the up-down sliding plate 40 to the stepped-down depression part 13.

With continued reference to FIG. 2, the upper part of the up-down sliding groove 52 is installed on the lower part of the first fastening protrusion 41. The up-down sliding groove 52 extends or is formed obliquely, which allows the first fastening protrusion 41 to be slid easily in up-down direction along with the up-down sliding groove 52.

In addition, a downward stopper 42 protrudes on the side of the up-down sliding plate 40. The downward stopper 42 is configured to be inserted into an insertion hole 54 of the plate 50 (FIG. 3). The downward stopper 42 may be inserted into the insertion hole 54 when the up-down sliding plate 40 is dropped toward the support plate 50. The insertion of the downward stopper 42 into the insertion hole 52 inhibits or prevents the sub-body 20 from being moved in a front and rear direction, such as when the portable terminal is being moved or vibrated.

In this exemplary embodiment, the downward stopper 42 is tapered downward to allow for an easier insertion into the insertion hole 54. As shown in FIGS. 2 and 3, the downward stopper 42 also includes a guide protrusion 43 provided or formed on the side of the downward stopper 42. The support plate 50 includes a guide groove 53 provided or formed on the side surface of the support plate 50. The guide groove 53 is configured to allow the guide protrusion 43 to be inserted into and slid along the guide groove 53. This allows the up-down sliding plate 40 to be lowered or dropped stably to the support plate 50 by the guide protrusion 43 and the guide groove 53, without or with little vibration.

A pair of springs 70 may be provided to assist with the sliding of the plate members 20 and 30 relative to each other. By way of example, the springs 70 may comprise one or more zigzag springs or M-shaped springs as disclosed in U.S. Patent Application Publication 2009/0035056, the entire disclosure of which is incorporated herein by reference. Alternately, other biasing, resilient, or elastic members may be used for biasing the relative sliding movement of the plates 30, 40 towards the open and/or closed position and/or for biasing the plates 30, 40 to remain in the open and/or closed position.

FIG. 7 illustrates the exemplary manner in which horizontal movement springs 70 may be installed. As shown in FIG. 7, the springs 70 may be bent horizontally such that the installment space for the horizontal sliding plate 30 and the up-down sliding plate 40 is reduced or minimized, thus allowing for a more slim portable terminal.

With reference now to FIGS. 4 through 7, an exemplary operation of the portable terminal and the sliding mechanism will be provided for purposes of illustration only. FIG. 4 illustrates the portable terminal in a closed state or condition. FIG. 5 illustrates the portable terminal in an intermediate position between the open and closed states or positions. In FIG. 5, the intermediate position occurs while opening and closing the portable terminal. FIG. 6 illustrates the portable terminal in an opened state or condition in which the plate 30 has been dropped or lowered downwardly relative to the stepped-down portion 13. In addition, FIG. 7 illustrates the portable terminal and the springs 70 in the closed state (FIG. 7(a)) and the opened state (FIG. 7(b)).

As shown in FIG. 4a, the sub-body 20 is supported on the support protrusion 11, which is on the side of the main body 10 when the sub-body 20 closed with respect to the main body 10. In the closed condition, the up-down sliding plate 40 is arranged on the upper part or portion of the support plate 50.

In this closed condition, the torsion springs 60 apply an elastic force that biases the up-down sliding plate 40 generally towards the support plate 50. But the sub-body 20 is supported by the support protrusion part 11 and the horizontal sliding plate 30 is supported by the main body 10. Accordingly, the sub-body 20 and the up-down sliding plate 40 are not dropped and remain in the state as shown in FIG. 4.

As shown in FIG. 7(a), the sub-body 20 is retained in the closed state with respect to the main body 10 by the elastic or biasing force of the springs 70. From the closed condition, a user may then push or slide the sub-body 20 horizontally such that the portable terminal is placed in the intermediate position and takes the form as shown in FIG. 5.

FIG. 5 shows an intermediate state before the sub-body 20 is dropped or lowered. In FIG. 5, the sub-body 20 has been slidably moved or opened with respect to the main body 10, but the sub-body 20 has not yet been lowered or dropped. When a user pushes or slides horizontally the sub-body 20, the horizontal sliding plate 30 is moved together with the sub-body. The horizontal sliding plate 30 is guided and moved by the up-down sliding plate 40.

With reference to FIGS. 7(a) and 7(b), the springs 70 are initially in their original or generally relaxed state (FIG. 7(a)) when the portable terminal is closed. When a user tries to open the terminal, for example, by sliding the sub-body 20 relative to the main body 10, the springs 70 start to be compressed. Accordingly, the "zigzag" portions at both sides of each spring 70 are compressed and then the central portion (e.g., "M-shaped portion" in this exemplary embodiment) is compressed. As the sub-body 20 further slides towards the open position (FIG. 7(b)) relative to the main body 10, the springs 70 reach a transition point where the opening and closing forces are balanced. In other words, even slightly beyond the transition point, the sub-body 20 can automatically slide to the open position (FIG. 7(b)) by means of the resiliency of the springs 70. That is, the portable terminal can be automatically and completely opened or closed, without exerting any further force by the user after the transition point. When the sub-body 20 is slightly beyond the transition point, the springs 70 become restored to their original state mainly by means of the central portion such that the sub-body 20 and main body 10 can be moved relatively away from each other.

FIG. 6 shows the sub-body 20 in the opened state with respect to the main body 10. As shown in FIG. 6, the up-down sliding plate 40 has been dropped toward the support plate 50 by way of the elastic or biasing force of the torsion springs 6. That is, with the elastic force of the torsion springs 60 installed to the fastening protrusions 41 and 51, the first fastening protrusions 41 are moved downward along the respective up-down sliding grooves 52, and as a result the torsion springs 60 are rotated around the respective second fastening protrusions 51 and descend. Eventually, the sub-body 20 is dropped to the stepped-down part 13 of the main body 10. In addition, the downward stopper 42 is inserted into the insertion hole 54, which thus keeps the sub-body 20 relatively stable and inhibits vibration of the sub-body 20.

Accordingly, opening of the sub-body 20 with respect to the main body 10 thus includes the sub-body 20 dropping or lowering to the stepped-down part 13 of the main body 10. This, in turn, thus reduces the thickness of the portable terminal and also may improve the user's wearing comfort and the structural stability of the portable terminal.

The operation of closing the sub-body 20 with respect to the main body 10 would be performed in the opposite or inverse order of the earlier description.

As described above, exemplary embodiments of the slide mechanisms and assemblies may be applied to slide-down opening and closing type portable terminals in such a manner that, when the sub-body is opened from the main body, the combined thickness of the terminal can be reduced (and in some embodiments maximally reduced).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A slider mechanism for a portable terminal having a first body, a second body slidable relative to the first body between a closed position and an opened position, the first body including a stepped-down portion, the second body configured to be dropped downwardly into the stepped-down portion when the sub-body is slidably moved to the opened position, the slider mechanism comprising:
a horizontal sliding plate configured to be coupled to the second body of the portable terminal;
an up-down sliding plate configured to be slidably coupled to the horizontal sliding plate, and configured to be coupled to the first body of the portable terminal;
a support plate configured to be installed in the stepped-down portion of the main body; and
at least one biasing device for applying a force for biasing the up-down sliding plate downwardly towards the stepped-down portion.

2. The slider mechanism of claim 1, wherein the at least one biasing device comprises at least one torsion spring.

3. The slider mechanism of claim 1, wherein:
the up-down sliding plate includes fastening protrusions on generally opposite sides of the up-down sliding plate;
the support plate includes second fastening protrusions and sliding grooves on generally opposite sides of the support plate, each sliding groove having an upper portion that is opened;
the first fastening protrusions are slidable along the corresponding sliding grooves of the support plate; and
the at least one biasing device comprises at least two torsion springs coupled to corresponding pairs of the first and second fastening protrusions on the generally opposite sides of the up-down sliding plate and support plate.

4. The slider mechanism of claim 1, further comprising at least one horizontal movement spring between the horizontal sliding plate and the up-down sliding plate, whereby the horizontal movement spring is configured to be compressed and restored while the second body slides relative to the first body between the open and closed positions.

5. The slider mechanism of claim 1, wherein:
the up-down sliding plate includes at least one first fastening protrusion on at least one side of the up-down sliding plate;
the support plate includes at least one second fastening protrusion and a sliding groove on at least one side of the support plate, the sliding groove having an upper portion that is opened;
the biasing device is coupled to the first and second fastening protrusions; and
the first fastening protrusion is slidable along the sliding groove of the support plate.

6. The slider mechanism of claim 5, wherein the sliding groove is oblique.

7. The slider mechanism of claim 1, wherein:
the up-down sliding plate includes at least one downward stopper protruding downwardly from the up-down sliding plate; and
the support plate includes at least one insertion hole into which the downward stopper may be inserted.

8. The slider mechanism of claim 7, wherein:
the downward stopper includes a guide protrusion on a side of the downward stopper; and
the support plate includes a guide groove on a side of the support plate into which the guide protrusion may be inserted.

9. The slider mechanism of claim 7, wherein the downward stopper is tapered downward.

10. A portable terminal comprising the slider mechanism of claim 1.

11. A slide-down type portable terminal comprising:
a main body having a stepped-down portion;
a sub-body slidable relative to the main body between a closed position and an opened position, the sub-body configured to drop downwardly into the stepped-down portion of the main body when the sub-body is in the opened position;
at least one elastic means for applying an elastic force for biasing the sub-body to drop downwardly towards the stepped-down portion;
a sliding assembly installed between the sub-body and the main body for allowing the sub-body to slide relative to the main body, wherein the sliding assembly comprises:
an up-down sliding plate configured to guide the sub-body to be slid horizontally, the up-down sliding plate being slidable in an up-down direction; and
a support plate installed in the stepped-down portion of the main body, the support plate configured to guide the sliding of the up-down sliding plate in an up-down direction.

12. The portable terminal of claim 11, wherein the at least one elastic means comprises at least one torsion spring.

13. The portable terminal of claim 11, wherein the sliding assembly further comprises a horizontal sliding plate coupled to the sub-body, and wherein the up-down sliding plate is configured to guide the sliding of the horizontal sliding plate.

14. The portable terminal of claim 13, further comprising at least one horizontal movement spring between the horizontal sliding plate and the up-down sliding plate, whereby the horizontal movement spring is configured to be compressed and restored while the sub-body slides relative to the main body between the open and closed positions.

15. The portable terminal of claim 11, wherein:
the up-down sliding plate includes at least one first fastening protrusion on at least one side of the up-down sliding plate;
the support plate includes at least one second fastening protrusion and a sliding groove on at least one side of the support plate, the sliding groove having an upper portion that is opened;
the elastic means is coupled to the first and second fastening protrusions; and
the first fastening protrusion is slidable along the sliding groove of the support plate.

16. The portable terminal of claim 11, wherein:

a top surface of the main body is disposed generally under the sub-body when the sub-body is in the closed position; and the top surface of the main body is generally aligned with a top surface of the sub-body when the sub-body is in the opened position.

17. A slide-down type portable terminal comprising:

a main body having a stepped-down portion;

a sub-body slidable relative to the main body between a closed position and an opened position, the sub-body configured to drop downwardly into the stepped-down portion of the main body when the sub-body is in the opened position;

at least one elastic means for applying an elastic force for biasing the sub-body to drop downwardly towards the stepped-down portion; and a support protrusion on a side portion of the main body up to the stepped-down portion, the support protrusion supporting the sub-body to avoid the sub-body from being dropped when the sub-body is being closed.

18. A slide-down type portable terminal comprising:

a main body having a stepped-down portion;

a sub-body slidable relative to the main body between a closed position and an opened position, the sub-body configured to drop downwardly into the stepped-down portion of the main body when the sub-body is in the opened position;

at least one elastic means for applying an elastic force for biasing the sub-body to drop downwardly towards the stepped-down portion;

wherein the stepped-down portion of the main body includes a groove into which a support plate is inserted and seated.

19. The portable terminal of claim 18, further comprising a sliding assembly installed between the sub-body and the main body for allowing the sub-body to slide relative to the main body, wherein the sliding member comprises:

an up-down sliding plate configured to guide the sub-body to be slid horizontally, the up-down sliding plate being slidable in an up-down direction; and a support plate installed in the stepped-down portion of the main body, the support plate configured to guide the sliding of the up-down sliding plate in an up-down direction.

20. A portable terminal comprising:

a first body having a stepped-down portion;

a second body slidable relative to the first body between a closed position and an opened position, the second body configured to drop downwardly into the stepped-down portion of the first when the second body is in the opened position;

an up-down sliding plate coupled to the first body, the up-down sliding plate including fastening protrusions on generally opposite sides of the up-down sliding plate;

a horizontal sliding plate coupled to the second body, and slidably coupled to the up-down sliding plate;

a support plate installed in the stepped-down portion of the first body, the support plate including second fastening protrusions and sliding grooves on generally opposite sides of the support plate, the sliding grooves having opened upper portions for slidably receiving the corresponding first fastening protrusions; and at least two torsion springs coupled to corresponding pairs of the first and second fastening protrusions on the generally opposite sides of the up-down sliding plate and support plate.

* * * * *